(12) United States Patent
Kihara

(10) Patent No.: US 12,528,920 B2
(45) Date of Patent: Jan. 20, 2026

(54) FIBER-REINFORCED PLASTICS AND METHODS FOR RECOVERING FIBERS CONTAINED THEREIN

(71) Applicant: KANAGAWA UNIVERSITY, Yokohama (JP)

(72) Inventor: Nobuhiro Kihara, Yokohama (JP)

(73) Assignee: KANAGAWA UNIVERSITY, Yokohama (JP)

( * ) Notice: Subject to any disclaimer, the term of this patent is extended or adjusted under 35 U.S.C. 154(b) by 493 days.

(21) Appl. No.: 18/172,229

(22) Filed: Feb. 21, 2023

(65) Prior Publication Data

US 2023/0265250 A1    Aug. 24, 2023

(30) Foreign Application Priority Data

Feb. 22, 2022    (JP) .................. 2022-025866

(51) Int. Cl.
  *C08J 5/04*     (2006.01)
  *C01B 32/05*    (2017.01)

(52) U.S. Cl.
  CPC ............... *C08J 5/042* (2013.01); *C01B 32/05* (2017.08); *C08J 2363/00* (2013.01)

(58) Field of Classification Search
  CPC ........ C08J 5/042; C08J 2363/00; C08J 11/16; C08J 11/14; C08J 2333/26; C01B 32/05; Y02W 30/62
  See application file for complete search history.

(56) References Cited

FOREIGN PATENT DOCUMENTS

| | | | |
|---|---|---|---|
| EP | 4083086 A1 | 11/2022 | |
| JP | 2001-240697 A | 9/2001 | |
| JP | 2006-022315 A | 1/2006 | |
| JP | 2007-246831 A | 9/2007 | |
| JP | 2011-052075 A | 3/2011 | |
| JP | 2011-122032 A | 6/2011 | |
| JP | 2011-236381 | * 11/2011 | ............ C08G 59/40 |
| JP | 2011-236381 A | 11/2011 | |
| JP | 2013-001692 A | 1/2013 | |
| JP | 2013-037067 A | 2/2013 | |
| JP | 2017025312 A | 2/2017 | |
| JP | 2019136932 A | 8/2019 | |
| JP | 2020-114904 A | 7/2020 | |
| JP | WO2021131003 A1 | 12/2021 | |

OTHER PUBLICATIONS

Li, et al., An Improvement of Thermal Conductivity of Underfill Materials for Flip-Chip Packages, IEEE Transactions of Advanced Packaging 2003; 26(1): 25-32 (Year: 2003).*
Japan Patent Office, Office Action Issued in Application No. 2022-025866, Aug. 27, 2025, 3 pages. English translation submitted, original document unavailable.

* cited by examiner

*Primary Examiner* — Daniel C. McCracken
(74) *Attorney, Agent, or Firm* — Alleman Hall & Tuttle LLP

(57) ABSTRACT

To provide a fiber-reinforced plastic from which fibers can be readily recovered in a reusable state. A fiber-reinforced plastic contains a matrix polymer compound having cleavable functional groups represented by Formula (1), where wavy lines represent bonds to other atoms. When the polymer compound having cleavable functional groups represented by Formula (1) is put into contact with an aqueous solution of hypochlorous acid or a salt thereof, scission occurs between the CO—NH bonds in Formula (1), resulting in conversion to a lower molecular weight compound. This matrix polymer compound is thereby soluble in an appropriate solvent and is separated from the fiber contained in the FRP.

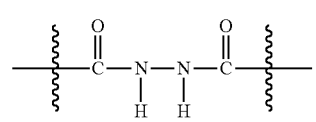

(1)

4 Claims, No Drawings

FIBER-REINFORCED PLASTICS AND METHODS FOR RECOVERING FIBERS CONTAINED THEREIN

TECHNICAL FIELD

This invention relates to fiber-reinforced plastics and a method of recovering fibers contained therein.

BACKGROUND ART

Fiber-reinforced plastics (hereinafter referred to as FRPs) are high-strength composite materials that include a combination of lightweight plastics having low modulus of elasticity and low strength with reinforcing materials, such as glass fiber or carbon fiber, with high modulus of elasticity and high tensile strength. FRPs, which have excellent mechanical characteristics, have been used in a wide range of fields, such as transportation equipment, housing equipment, pools, and construction materials. In particular, carbon fiber-reinforced plastics (hereinafter referred to as CFRPs) including carbon fiber as reinforcing materials, which are light-weight and have strength comparable to steel, have been used in a wide range of fields, as materials to replace steel plates conventionally used in automobiles and aircraft.

However, FRPs often create issues regarding waste disposal due to their superior durability and strength. In addition, carbon fibers used in CFRPs, while exhibiting excellent properties, are very expensive. If carbon fibers could be recovered from waste CFRPs to be reused, it would be very useful from both environmental and cost perspectives. Against this background, various methods of recovering carbon fibers contained in CFRPs without degradation have been proposed in, for example, Patent Literatures 1-5. These methods include chemical treatments, such as decomposition of plastics in CFRPs under high temperature in the presence of radicals, and physical treatments, such as removal of plastics in CFRPs through treatment of CFRPs with superheated steam at 800° C. or higher.

Aside from these proposals, the inventors have proposed polydiacylhydrazine that does not deteriorate over time in use, but can be readily decomposed at the time of disposal (see Patent Documents 5 and 6). This polymer shows a certain level of durability during use as a plastic, but can be readily decomposed in a sodium hypochlorite solution at the time of disposal.

CITATION LIST

Patent Literatures

PTL1: JP 2001-240697A
PTL2: JP 2007-246831A
PTL3: JP 2011-122032A
PTL4: JP 2020-114904A
PTL5: JP 2006-022315A
PTL5: JP 2011-052075A

BRIEF DESCRIPTION OF THE INVENTION

Problems to be Solved

An object of the present disclosure, which was made in view of the above circumstances, is to provide a fiber-reinforced plastic from which fibers contained therein can be readily recovered in a reusable state.

Means to Solve Problems

As a result of diligent study to solve the above problem, the inventor found that an FRP containing a matrix polymer compound with a diacylhydrazine skeleton represented by Formula (1) can be decomposed by a simple process of immersion in an aqueous solution of hypochlorous acid or a salt thereof, and the fibers contained in the FRP can be recovered in a reusable state, while the polymer compound has sufficient durability as the matrix of FRP. The present disclosure has been made based on the above findings and provides the following aspects.

(1) In the present disclosure, provided is a fiber-reinforced plastic comprising a matrix polymer compound having cleavable functional groups represented by Formula (1):

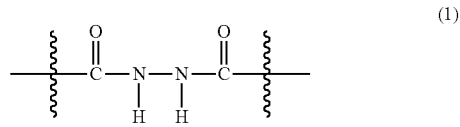 [SMILES: *C(=O)NNC(*)=O]

where wavy lines represent bonds to other atoms.

(2) In the present disclosure, the fiber-reinforced plastic according to Aspect (1) is a carbon fiber-reinforced plastic.

(3) In the present disclosure, the polymer compound in the fiber-reinforced plastic according to Aspect (1) or (2) is a cured epoxy resin or a cross-linked vinyl polymer.

(4) In the present disclosure, also provided is a method of recovering a fiber contained in a fiber-reinforced plastic, comprising immersing the fiber-reinforced plastic described in any one of Aspects (1) to (3) in an aqueous solution of hypochlorous acid or a salt thereof to decompose the matrix polymer compound, and separating the fiber from the decomposed matrix polymer compound to recover the fiber contained in the fiber-reinforced plastic.

Advantages of the Invention

The present disclosure provides a fiber-reinforced plastic from which the fibers contained therein can be readily recovered in a reusable state.

EMBODIMENTS OF THE INVENTION

Embodiments of a fiber-reinforced plastic and a method of recovering fibers contained in the fiber-reinforced plastic will now be described. The present invention should not be construed to be limited in any way to the following embodiments and may be implemented with modifications within the scope of the invention.

The fiber-reinforced plastic (FRP) of the present disclosure will now be described. The fiber-reinforced plastic of the present disclosure comprises a matrix polymer compound having cleavable functional groups represented by Formula (1) where wavy lines represent bonds to other atoms. The polymer compound "having cleavable functional groups represented by Formula (1)" indicates that the structural units represented by Formula (1) are contained in the molecule of the polymer compound. The structural units may be present in two or more sites in the polymer molecule.

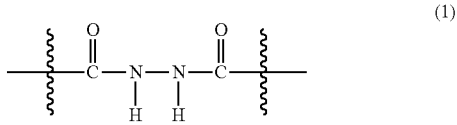
(1)

FRP is generally made by impregnating a matrix material with fibers such as glass fibers and carbon fibers, molding the impregnated material into a desired shape, and then curing the matrix material. Examples of the reinforcing fiber includes glass fibers, carbon fibers, and aramid fibers, among which carbon fibers are preferred. Examples of the shape of these fibers include unidirectional materials of fibers oriented in one direction, woven materials such as plain weaves, twill weaves, and sateen weaves, and non-woven materials.

Examples of the preferred matrix materials include, but are not limited to, curable compositions containing epoxy resins and monomers having ethylenically unsaturated bonds. The above-described fibers are impregnated into the matrix material which is then cured by heat or other means into an FRP. In other words, the matrix is a cured product of epoxy resins and curable compositions, which are intricately cross-linked polymeric compounds. In some cases, such cured materials may not be regarded as polymer compounds. However, in the present disclosure, compounds including such cured materials are called polymer compounds.

As described above, the matrix polymer compound contains cleavable functional groups represented by Formula (1). The cleavable functional groups may be included, for example, in the cross-linking structure that cross-links the polymer molecules during curing, or may be included in the main monomer chains of the epoxy resin. Under the conditions in which the FRP of the present disclosure is normally used, this polymer compound is stable, and thus the FRP of the present disclosure exhibits excellent durability. In contrast, the cleavable functional groups represented by Formula (1) decomposes through the following chemical reaction when put into contact with an aqueous solution of hypochlorous acid or a salt thereof. In the following chemical reaction, sodium hypochlorite is used as hypochlorous acid or salt thereof, but another acid or salt may also be used.

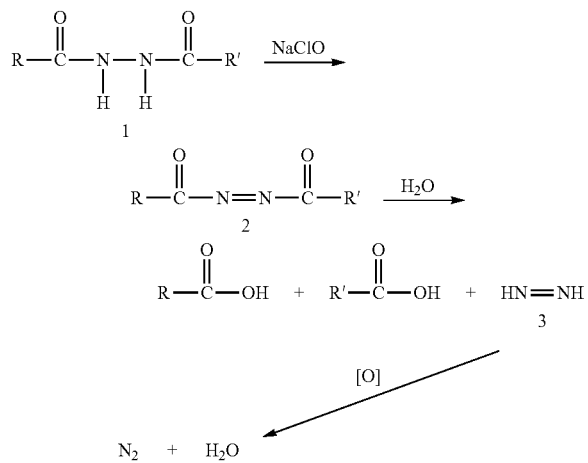

In detail, chemical species 1 containing cleavable functional groups represented by Formula (1) is oxidized by sodium hypochlorite into highly reactive azodicarbonyl compound 2, which is immediately hydrolyzed into two carboxylic acid molecules and diimide 3. Such a series of chemical reactions results in the cleavage of the cross-linked structure that cross-links the polymer molecules, or scission of the main chain of the polymer molecules into short chains. As a result, the matrix polymer compound is no longer able to maintain the cured state and becomes solvent soluble and removable. The removal of the polymer compound from the FRP enables the fibers contained in the FRP to be recovered. The recovered fibers are not degraded during this chemical treatment and remain reusable.

Any matrix polymer compound can be used without limitation, given that it has cleavable functional groups represented by Formula (1). Preferred examples of such polymer compounds include cured epoxy resins and cross-linked vinyl polymers. FRPs containing these matrix polymer compounds exhibit sufficient durability in use, while the matrices can be readily removed by the above-mentioned treatment after use. Preferred examples of these polymer compounds will be described as follows.

The cured epoxy resin is prepared by curing an epoxy resin containing a polyepoxy compound, a polyol compound, and a curing catalyst such as an amine. This pre-cured epoxy resin is soaked into the above-mentioned fibers, and then the epoxy resin is cured to make FRP.

The polyepoxy compound and/or the polyol compound in the epoxy resin contains cleavable functional groups represented by Formula (1). This means that the main chain of the polymer compound in the cured epoxy resin contains the cleavable functional groups represented by Formula (1).

For example, ordinary epoxy resins contain bisphenol compounds, such as bisphenol A, as polyol compounds. Cleavable functional groups represented by Formula (1) are preferably introduced into the molecules of the bisphenol compounds. Such bisphenol compounds can be prepared, for example, by the following synthetic route. Although four types of bisphenol compounds are listed below as examples for the sake of explanation, another suitable compound can also be employed in the present disclosure.

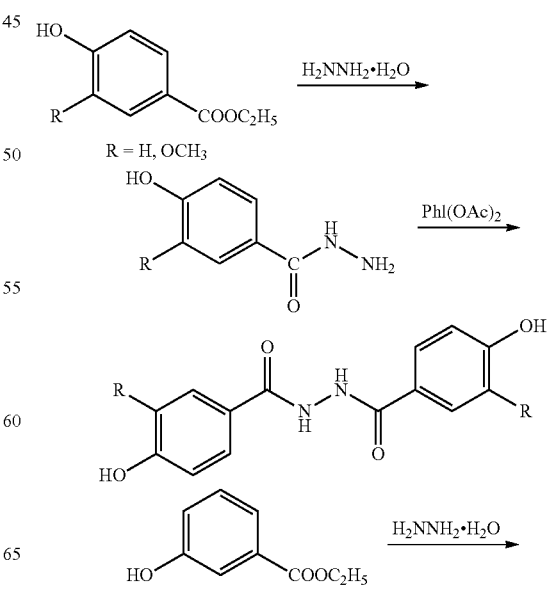

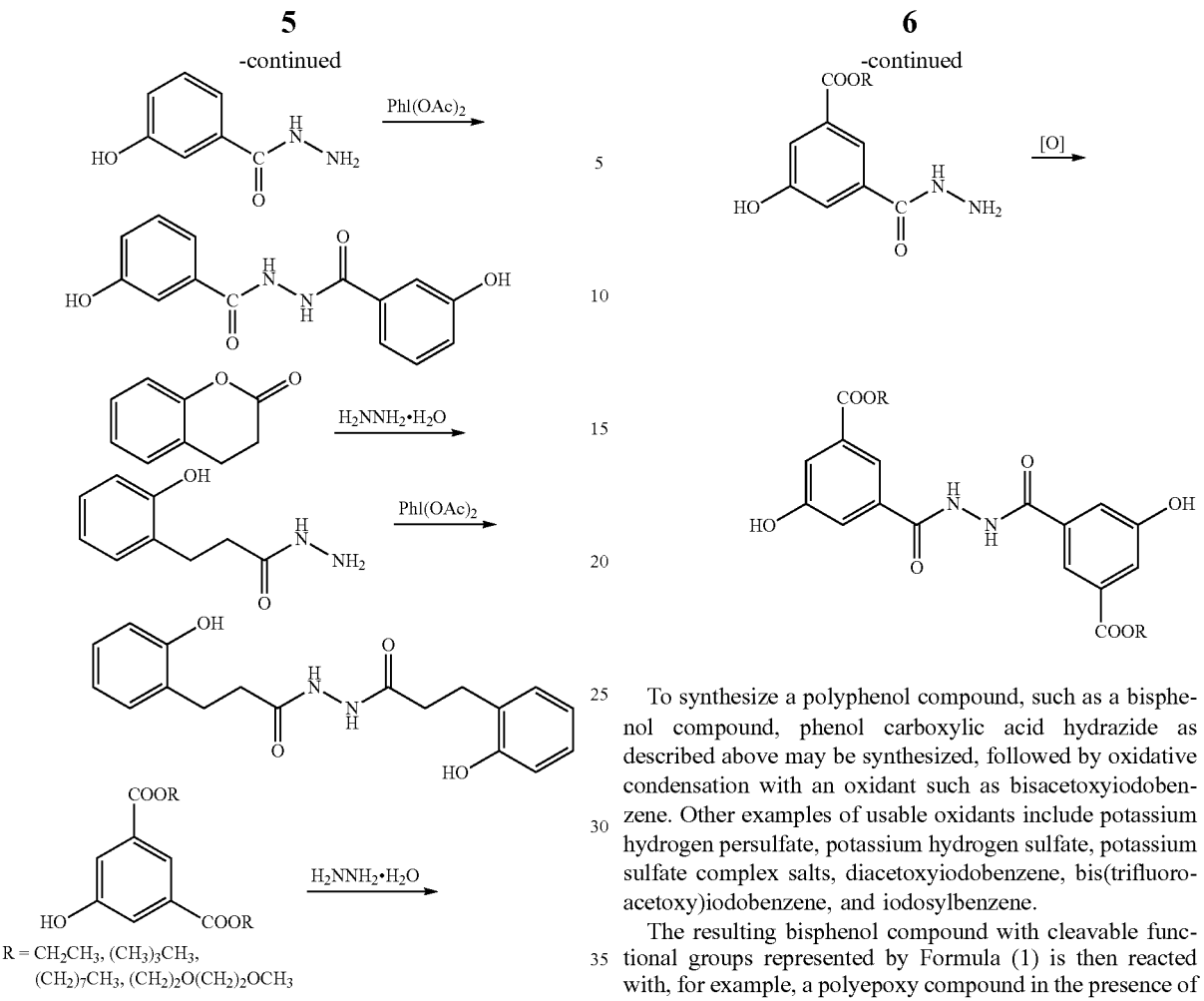

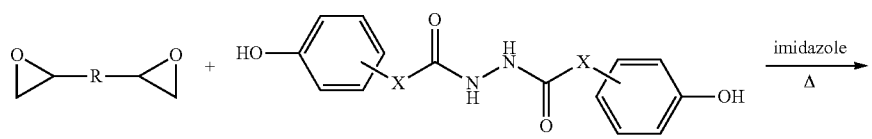

To synthesize a polyphenol compound, such as a bisphenol compound, phenol carboxylic acid hydrazide as described above may be synthesized, followed by oxidative condensation with an oxidant such as bisacetoxyiodobenzene. Other examples of usable oxidants include potassium hydrogen persulfate, potassium hydrogen sulfate, potassium sulfate complex salts, diacetoxyiodobenzene, bis(trifluoroacetoxy)iodobenzene, and iodosylbenzene.

The resulting bisphenol compound with cleavable functional groups represented by Formula (1) is then reacted with, for example, a polyepoxy compound in the presence of a base catalyst such as imidazole for curing, as follows.

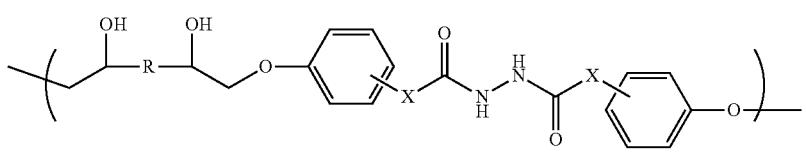

The main chain of the cured polymer compound after the above chemical reaction contains cleavable functional groups represented by Formula (1). The molecular weight of this polymer compound is reduced by contact with an aqueous solution of hypochlorous acid or a salt thereof, as described below. This low molecular weight compound is no longer a cured product and thus can be dissolved in an appropriate solvent, allowing the fibers contained in the FRP to be recovered.

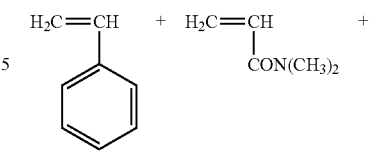

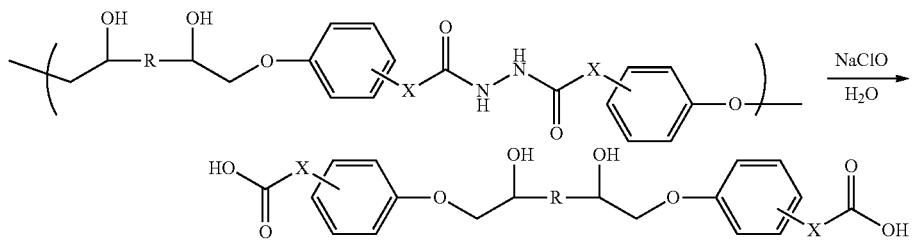

The cross-linked vinyl polymer will now be described.

The cross-linked vinyl polymer is prepared by radical polymerization of (A) a monomer having an ethylenically unsaturated bond and (B) a cross-linking agent having two or more ethylenically unsaturated bonds and cleavable functional groups represented by Formula (1) in the molecule. These compounds (A) and (B) are mixed with a radical polymerization initiator to prepare a liquid polymerizable composition, fibers are impregnated with this polymerizable composition, and the composite system is then heated to cure the polymerizable composition into FRP. Such a cross-linking agent is prepared, for example, by a reaction shown below of (meth)acryloyl chloride with hydrazine in the presence of a base. In this specification, (meth)acryloyl includes acryloyl and/or methacryloyl.

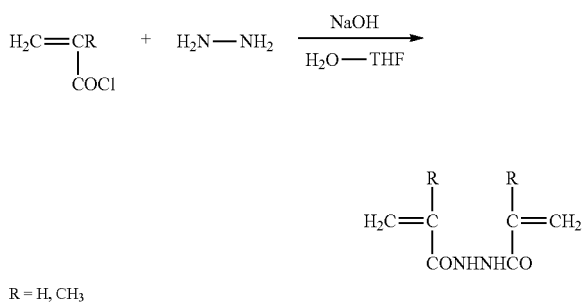

R = H, CH₃

The resulting crosslinking agent is then polymerized together with a monomer having an ethylenically unsaturated bond (e.g., vinyl monomer) in the presence of a polymerization initiator, such as azobisisobutyronitrile (AIBN), to form a vinyl polymer. The crosslinking agent has cleavable functional groups represented by Formula (1) in the crosslinked portion, and the crosslinked portion is then cleaved upon contact with an aqueous solution of hypochlorous acid or a salt thereof. The vinyl polymer with the cleaved cross-linked residues is no longer a cured product and can be dissolved in an appropriate solvent, and the fibers contained in the FRP can be recovered.

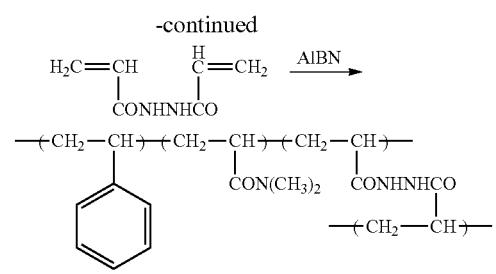

Examples of the monomers having ethylenically unsaturated bonds include ethylene, styrene, acrylic acid, acrylic esters, methacrylic esters, acrylamide, N-substituted acrylamide, N,N-disubstituted acrylamide, acrylonitrile, butadiene, and vinyl acetate.

Examples of the polymerization initiators include those that generate radicals when heated, such as persulfates, e.g. sodium persulfate, potassium persulfate, and ammonium persulfate; peroxides, e.g. hydrogen peroxide, t-butyl peroxide, and methyl ethyl ketone peroxide; and azo compounds, e.g. azonitrile compounds, azoamidine compounds, cyclic azoamidine compounds, azoamide compounds, alkyl azo compounds, 2,2'-azobis(2-amidinopropane) dihydrochloride, and 2,2'-azobis[2-(2-imidazolin-2-yl)propane] dihydrochloride.

The method of recovering fibers contained in the fiber-reinforced plastic of the present disclosure is also another aspect of the present disclosure. The method of recovering fibers contained in the fiber-reinforced plastic is characterized in that the fiber-reinforced plastic of the present disclosure is immersed in an aqueous solution of hypochlorous acid or a salt thereof to decompose the matrix, and fibers contained in the fiber-reinforced plastic are separated to be recovered. As this process has already been explained, a detailed description will be omitted.

Preferably, the FRP is immersed in an aqueous solution of hypochlorous acid or a salt thereof to decompose the matrix while the aqueous solution is circulated by agitation. During this process, the FRP to be decomposed is preferably contained in an appropriate net container to prevent the fibers to be recovered from being dispersed in the circulated water.

EXAMPLES

The present disclosure will now be described more specifically by way of examples, but the invention should not be limited in any way to the examples.

Synthesis of Diacryloyl Hydrazine

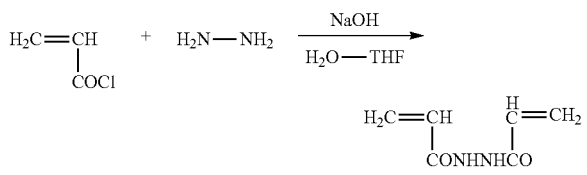

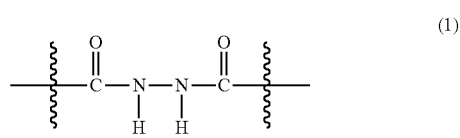 [SMILES: *C(=O)NNC(*)=O]

After 19 mL (235 mmol) of acryloyl chloride was dissolved in 30 mL of tetrahydrofuran, a solution of 10 g (255 mmol) of sodium hydroxide and 5.0 mL (103 mmol) of hydrazine monohydrate in 70 mL of water was added dropwise over 40 minutes thereto, then stirred for three hours. The precipitated solid was collected by filtration. The solid was dried under vacuum and recrystallized in ethyl acetate-hexane to give colorless crystals of diacryloylhydrazine. The recovered weight was 4.7 g (33% yield).

N,N-dimethylacrylamide (DMA), diacryloylhydrazine (DAH), and 2,2'-azobisisobutyronitrile (AIBN) were mixed in a molar ratio of 95:5:2 to prepare a polymerizable composition. After a 1-mm gap was provided between two polytetrafluoroethylene (PTFE) sheets, a carbon fiber sheet (CF sheet) was inserted into the gap between these two sheets. The polymerizable composition was then added to the CF sheet, which was then heated at 40° C. for one day and then at 100° C. for three hours to prepare a CFRP. The resulting CFRP was then washed with diethyl ether.

The washed CFRP was wrapped in a polyester net, the net was suspended in an aqueous 5% sodium hypochlorite solution, and the solution was stirred. After two days of stirring, the CFRP matrix disappeared and the carbon fiber sheets were able to be recovered. Observation of the recovered carbon fiber sheets with an electron microscope confirmed that the carbon fibers of the sheets were not damaged. The results show that the matrix can readily be removed from the FRP and fibers can be recovered in a reusable state from the FRP.

The invention claimed is:

1. A fiber-reinforced plastic, comprising:
   a matrix polymer compound having cleavable functional groups represented by Formula (1):

$$\begin{array}{c} O \quad\quad O \\ \| \quad\quad \| \\ -C-N-N-C- \\ | \quad | \\ H \quad H \end{array} \quad (1)$$

where wavy lines represent bonds to other atoms; and
reinforcing fibers comprising a material selected from the group consisting of a unidirectional material of fibers oriented in one direction, woven material, and non-woven material.

2. The fiber-reinforced plastic according to claim 1, wherein the fiber-reinforced plastic is a carbon fiber-reinforced plastic.

3. The fiber-reinforced plastic according to claim 1, wherein the polymer compound is a cured epoxy resin or a cross-linked vinyl polymer.

4. A method of recovering a fiber contained in a fiber-reinforced plastic, comprising:
   immersing the fiber-reinforced plastic according to claim 1 in an aqueous solution of hypochlorous acid or a salt thereof to decompose the matrix polymer compound; and
   separating the fiber from the decomposed matrix polymer compound to recover the fiber contained in the fiber-reinforced plastic.

* * * * *